United States Patent [19]

Wolfe

[11] 4,139,293
[45] Feb. 13, 1979

[54] FLASHGUN
[76] Inventor: Maynard F. Wolfe, Dodwell Mansions #11, 77 Peak Rd., Hong Kong, Hong Kong
[21] Appl. No.: 768,418
[22] Filed: Feb. 14, 1977
[30] Foreign Application Priority Data
Nov. 4, 1976 [GB] United Kingdom ............... 45982/76
[51] Int. Cl.² ............................................. G03B 15/03
[52] U.S. Cl. ................................................. 354/141
[58] Field of Search ...................... 354/141, 126, 145
[56] References Cited
U.S. PATENT DOCUMENTS

| 3,559,548 | 2/1971 | Ackerman | 354/141 |
| 3,782,258 | 1/1974 | Boekkooi et al. | 354/141 X |
| 3,809,878 | 5/1974 | Brandt | 354/141 X |
| 4,025,933 | 5/1977 | Berg | 354/141 |

FOREIGN PATENT DOCUMENTS 1423730 2/1976 United Kingdom ..................... 354/141

Primary Examiner—Donald A. Griffin
Attorney, Agent, or Firm—McDougall, Hersh & Scott

[57] ABSTRACT

A flashgun is provided with an integral plug adaptor unit having at least two different plug members for connection to different types of camera flash sockets. The adaptor can be oriented within the flashgun housing so that a desired plug can be brought into a position where it is available for interconnecting a camera socket with the flashgun so that the flashgun can be operated through the socket. The plug which is not in use is stored within the flashgun body in an inoperative position.

5 Claims, 5 Drawing Figures

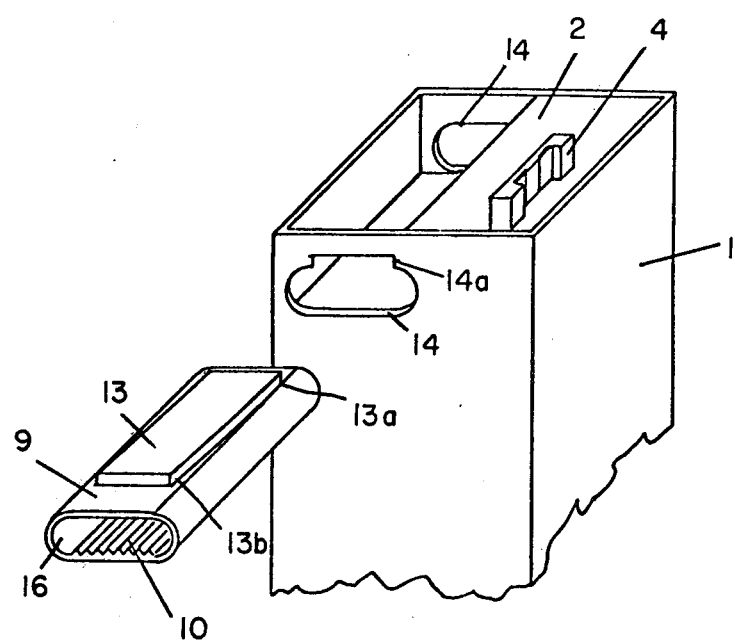

FLASHGUN

The invention relates to an electronic flashgun which can be mounted on cameras with various different types of flashbulb or flashgun receiving sockets.

According to the invention there is provided a flashgun having a number of different plugs for connection to different types of camera flash sockets, wherein the plugs can alternately be brought into a position where they are available for connection to a camera socket, the out of use plug(s) being stored in the flashgun body.

Preferably the different plugs are provided on an adaptor which can be inserted into the flashgun in a number of different orientations so that in each orientation, one plug is exposed and the other or others are hidden.

Preferably the flashgun includes means for mounting it on a camera. These means may suitably include a wire clip. The mounting means can be adaptable for different sizes of camera.

The invention also extends to an adaptor for use with the flashgun previously described, and which has a plurality of plugs for camera flash sockets arranged thereon.

The invention will now be described, by way of example, with reference to the accompanying drawings, in which:

FIG. 5 is an exploded view of the locking system for the adaptor.

Figure 1:
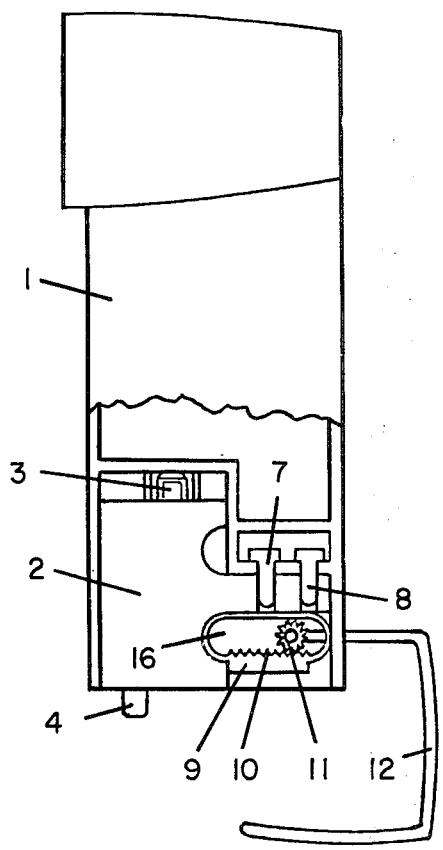
FIG. 1 is a side view, partly in section, of a flashgun according to the invention.
Figure 2:
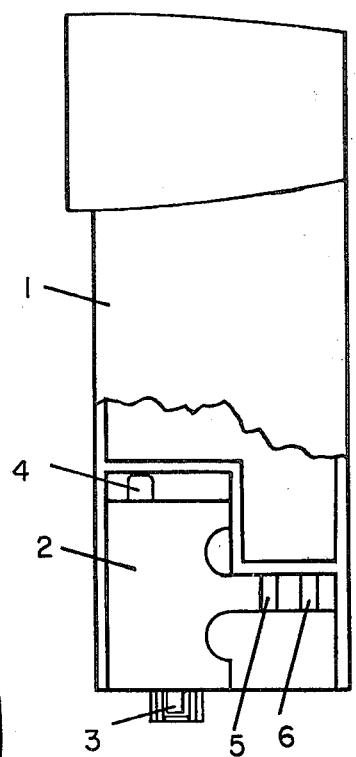
FIG. 2 is a view corresponding to that of FIG. 1 but with the adaptor reversed.
Figure 3:
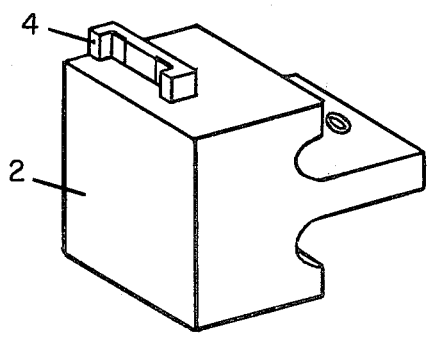
FIGS. 3 and 4 show respectively the two ends of the adaptor.
Figure 4:
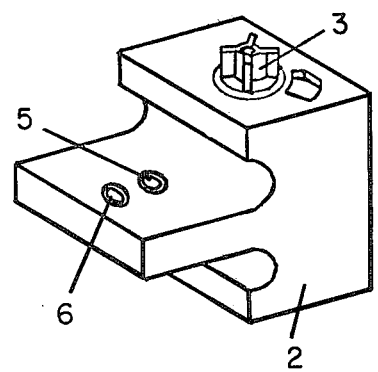

The flashgun has a body 1 which contains the flashbulb and reflector, batteries and the necessary circuitry.

The adaptor 2 slides into a recess in the bottom of the body 1, and has two contact sleeves 5, 6 which connect with terminal pins 7, 8 in the body. The adaptor will normally be made of plastics material, and holes therein will be bushed with metal conducting sleeves 5, 6 which extend right through the holes so that the contact between the sleeves and pins 7, 8 will be made in the same way whichever way up the adaptor is.

The adaptor shown has at one end a plug 4 corresponding to the plug on a "Flip Flash" type of flash bulb, and at the other end a plug 3 corresponding to the plug on a "Magicube" flash bulb. It will be understood that these two plugs are shown by way of example only, and other plugs will also be available on adaptors, for connecting with "Hot Shoe" sockets and any other types of socket which may exist or be produced.

Once the adaptor is fitted in the flashgun and connected to a camera's flash socket, the gun will be actuated by the camera's flash actuating mechanism in the conventional way associated with that particular socket.

The adaptor 2 is held in the flashgun body 1 by a special locking device. This consists of a hollow oval slide 9 with a rectangular projection 13 on one face. The body 1 has corresponding oval openings 14 on two opposite faces, and one of these openings includes an additional rectangular portion 14a. The openings 14 are positioned so that their lower edges (in the orientation of FIG. 5) are flush with the surface of the adaptor portion carrying the sleeves 5. When the sleeve is inserted, the adaptor will thus be held firmly in place.

The rectangular projection 13 is attached to the slide at one end (13a) only. At the other end (13b), it is sprung away from the slide 9, so that on insertion it will be pushed against the slide as it passes through opening 14a. Once through this opening, the projection will spring away from the slide to engage behind the wall of the body 1 to prevent the slide inadvertently falling out. To remove the slide, the projection can be pushed down with a finger so that it will pass through openings 14a.

The interior 16 of the slide has a series of grooves 10 which cooperate with a grooved roller 11. The diameter of this roller is such that it contacts the opposite interior face of the slide at the same time. There is sufficient resilience in the system to retain the roller in engagement with any particular groove or set of grooves, but to permit it to be moved to different positions along the oval. The roller has axial holes at its two ends (or a central hole 15 right through) and the ends of a wire clip 12 are inserted in these holes. The clip shown would fit on a 110-size camera, but other sizes are also envisaged. The roller 11 will be moved into a position corresponding to the position of the flash socket on the camera, so that the vertical part of the clip will lie against the back of the camera.

I claim:

1. A camera flashgun unit comprising:
   (a) a housing containing a flashgun and defining a recess therein,
   (b) a plug adaptor provided with at least two different plug members, each plug member for connection to a different type camera flash socket, said plug adaptor being removably received in the flashgun housing by insertion into said recess in at least two different positions such that for each position one plug member is exposed for interconnecting the flashgun and the camera socket while the other plug member is retained within the recess in an inoperative position, and
   (c) means for securing the flashgun unit to the camera.

2. A flashgun as claimed in claim 1, wherein manually releasable locking means are provided to hold the plug adaptor in each of its positions in the flashgun body.

3. The flashgun according to claim 2 in which the means for locking the adaptor in position of use within the flashgun comprises a flashgun housing having crosswise aligned openings other than round, a hollow slide having a cross-section corresponding to said openings for insertion of the slide through said openings and in which the slide is dimensioned to have a length greater than the spaced relation between said openings for projection beyond the housing when inserted to extend through the housing in locking position, means for releasably latching the slide in locking position within the housing, and means on the adaptor operatively engaging the slide in latching position for locking the adaptor in the flashgun.

4. The device as claimed in claim 3 in which the housing openings are of oval shape and the hollow slide is correspondingly shaped and dimensioned to enable insertion through said opening.

5. A flashgun as claimed in claim 1, wherein the securing means includes a wire clip which can be moved relative to the flashgun body to fit different size cameras.

* * * * *